(12) United States Patent
Deng et al.

(10) Patent No.: US 11,054,274 B2
(45) Date of Patent: Jul. 6, 2021

(54) METHOD, APPARATUS AND STORAGE MEDIUM FOR CONTROLLING NAVIGATION MAP

(71) Applicant: Baidu Online Network Technology (Beijing) Co., Ltd., Beijing (CN)

(72) Inventors: Jian Deng, Beijing (CN); Quankun Chen, Beijing (CN); Kai Huang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 253 days.

(21) Appl. No.: 16/146,422

(22) Filed: Sep. 28, 2018

(65) Prior Publication Data

US 2019/0033088 A1    Jan. 31, 2019

Related U.S. Application Data

(63) Continuation of application No. PCT/CN2016/096102, filed on Aug. 19, 2016.

(30) Foreign Application Priority Data

Mar. 31, 2016    (CN) .......................... 201610202159.0

(51) Int. Cl.
G01C 21/36        (2006.01)
(52) U.S. Cl.
CPC ........... G01C 21/367 (2013.01); G01C 21/36 (2013.01)
(58) Field of Classification Search
CPC ............................. G01C 21/367; G01C 21/36
See application file for complete search history.

(56) References Cited

U.S. PATENT DOCUMENTS 7,636,634 B2    12/2009    Sumizawa et al.
8,255,150 B2    8/2012    Doan et al.
(Continued)

FOREIGN PATENT DOCUMENTS

CN        1842832 A      10/2006
CN      101903742 A      12/2010
(Continued)

OTHER PUBLICATIONS

Abubakar, Adamu, Akram M. Zeki, and Haruna Chiroma. "Optimizing Three-Dimensional (3D) Map View on Mobile Devices as Navigation Aids Using Artificial Neural Network." 2013 International Conference on Advanced Computer Science Applications and Technologies. IEEE, 2013. (Year: 2013).*

(Continued)

*Primary Examiner* — Alan D Hutchinson
(74) *Attorney, Agent, or Firm* — Knobbe, Martens, Olson & Bear, LLP (57) ABSTRACT

A method, apparatus and storage medium for controlling a navigation map. The method includes: acquiring navigation key points contained in a navigation route between a current position of a vehicle and a next maneuver point, upon detecting a scale display event; calculating an optimal scale of the navigation map, according to the navigation key points and a pixel size of a terminal screen; and navigating the navigation route according to the optimal scale. The method, apparatus and storage medium for controlling a navigation map provided by the embodiments of the present disclosure improve the guidance of the navigation map and reduce the risk of missing an intersection during driving.

12 Claims, 4 Drawing Sheets

(56) References Cited

U.S. PATENT DOCUMENTS

| | | | |
|---|---|---|---|
| 9,052,212 B2 | 6/2015 | Doan et al. | |
| 2004/0243307 A1* | 12/2004 | Geelen | G01S 19/24 |
| | | | 701/469 |
| 2007/0005241 A1 | 1/2007 | Sumizawa et al. | |
| 2010/0268448 A1 | 10/2010 | Doan et al. | |
| 2012/0283946 A1 | 11/2012 | Doan et al. | |

FOREIGN PATENT DOCUMENTS

| | | |
|---|---|---|
| CN | 102047302 A | 5/2011 |
| CN | 103185582 A | 7/2013 |
| CN | 103185588 A | 7/2013 |
| CN | 103185600 A | 7/2013 |
| CN | 103575264 A | 2/2014 |
| CN | 104075729 A | 10/2014 |
| CN | 105865483 A | 8/2016 |
| EP | 0777206 A1 | 6/1997 |
| JP | 08-043112 A | 2/1996 |
| JP | 2008-089483 A | 4/2008 |
| JP | 2012-27548 A | 2/2012 |
| JP | 2012-098307 A | 5/2012 |
| WO | WO 2012/167154 A2 | 12/2012 |
| WO | WO 2014/060556 A1 | 4/2014 |

OTHER PUBLICATIONS

International Search Report dated Jan. 11, 2017 for International Application No. PCT/CN2016/096102, 6 pages.

* cited by examiner

METHOD, APPARATUS AND STORAGE MEDIUM FOR CONTROLLING NAVIGATION MAP

CROSS-REFERENCE TO RELATED APPLICATION

This application is a continuation of International Application PCT/CN2016/096102, with an international filing date of Aug. 19, 2016, which claims the priority from Chinese Application No. 201610202159.0, filed on Mar. 31, 2016, entitled "Method and Apparatus for Controlling Navigation Map and Storage Medium," having Baidu Online Network Technology (Beijing) Co., Ltd. as the applicant, the entire disclosure of which is incorporated herein by reference.

TECHNICAL FIELD

Embodiments of the present disclosure relate to the field of intelligent transportation technology, specifically relate to a method, apparatus and storage medium for controlling a navigation map.

BACKGROUND

Navigation devices have been widely used. Navigation devices navigate route-related navigation maps at fixed scales. However, when browsing a navigation map, a user usually needs to conduct a full or a local browse. Therefore, the user needs to manually click the zoom-in or zoom-out button on the navigation map, and adjust the electronic map to switch between the wide area map and the local area map. Such operation is not flexible, and the response is slow.

In order to avoid the problem of an improper map display range and a low navigation guidance caused by a fixed scale, at present, the scale is magnified when the vehicle is about to pass a maneuver point. When the vehicle passes the maneuver point, the scale is scaled back to the original size. This method clearly shows the detail information of the route of the maneuver point as the vehicle is about to pass the maneuver point. However, when the maneuver point has not been approached, the user can not know the detailed route information of the next maneuver point. Especially when travelling on the highway, the user sees only one navigation line on the map, which has little or no guidance effect on the user. The highway exit is a very important maneuver point, once accidentally missed, the user may need to take a long detour route, wasting the user's time and energy.

SUMMARY

Embodiments of the present disclosure provides a method, apparatus and storage medium for controlling a navigation map to improve the guidance of the navigation map and reduce the risk of missing an intersection during driving.

The embodiments of the present disclosure adopts the following technical solution:

In a first aspect, the embodiments of the present disclosure provides a method for controlling a navigation map, the method includes:

acquiring navigation key points contained in a navigation route between a current position of a vehicle and a next maneuver point, upon detecting a scale display event;

calculating an optimal scale of the navigation map, according to the navigation key points and a pixel size of a terminal screen; and navigating the navigation route according to the optimal scale.

In a second aspect, the embodiments of the present disclosure provides an apparatus for controlling a navigation map, the apparatus includes:

an acquisition module, configured to acquire navigation key points contained in a navigation route between a current position of a vehicle and a next maneuver point, upon detecting a scale display event;

an calculation module, configured to calculate an optimal scale of the navigation map, according to the navigation key points and a pixel size of a terminal screen; and an navigation module, configured to navigate the navigation route according to the optimal scale.

In a third aspect, the embodiments of the present disclosure provide a storage medium containing computer-executable instructions, when executed by a computer processor, perform a method for controlling a navigation map, the method includes:

acquiring navigation key points contained in a navigation route between a current position of a vehicle and a next maneuver point, upon detecting a scale display event;

calculating an optimal scale of the navigation map, according to the navigation key points and a pixel size of a terminal screen; and navigating the navigation route according to the optimal scale.

By distributing the navigation key points between the current position of the vehicle and the next maneuver point properly on the terminal screen according to the pixel size of the terminal screen, upon detecting a scale display event, and displaying the navigation route generated by the navigation key points on the terminal screen, the technical solution provided by the embodiments of the present disclosure enables the user to anticipate the next maneuver point ahead of time and make corresponding preparations, in order to improve the guidance of the navigation map and reduce the risk of missing an intersection during driving.

BRIEF DESCRIPTION OF THE DRAWINGS

To describe the technical solution in the embodiments of the present disclosure more clearly, the following briefly introduces the accompanying drawings required for describing the embodiments. Apparently, the accompanying drawings in the following description are merely some embodiments of the present disclosure, for those of ordinary skill in the art, these accompanying drawings may also be modified and replaced without creative work.

DETAILED DESCRIPTION OF EMBODIMENTS

The technical solution in the embodiments of the present disclosure will be clearly and completely described with reference to the accompanying drawings. Apparently, the described embodiments are merely some but not all of the embodiments of the present disclosure, for explaining the principle of the present disclosure, rather than limiting the disclosure to these specific embodiments. Based on the embodiments of the present disclosure, all other embodiments obtained by a person of ordinary skill in the art without creative efforts shall fall within the protection scope of the present disclosure.

The First Embodiment

Figure 1:
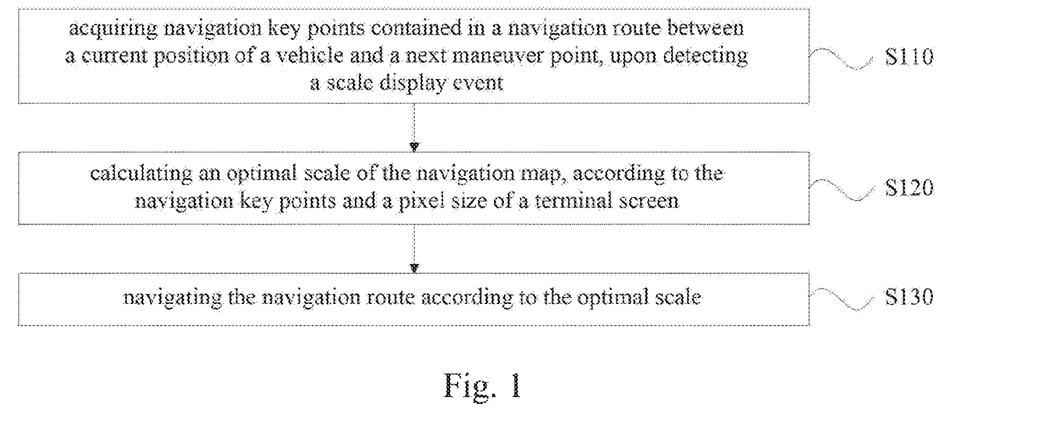
FIG. 1 is a flowchart of a method for controlling a navigation map according to the first embodiment of the present disclosure.

FIG. 1 is a flowchart of a method for controlling a navigation map according to the first embodiment of the present disclosure. The present embodiment may be applicable to the properly displaying of a navigation map, and the method may be executed by a terminal or a navigation server having a navigation function. Referring to FIG. 1, the method for controlling a navigation map provided by the present embodiment specifically includes the following.

In S110, navigation key points contained in a navigation route between a current position of a vehicle and a next maneuver point are acquired, upon detecting a scale display event.

Here, the scale display event refers to a display scale adjustment event of the navigation map. The maneuver point is an intersection point of two or more roads, wherein the vehicle may change the driving route as needed. The maneuver point may be at least one of a vehicle lane change location, a lane change location, and a vehicle swerve location. The next maneuver point is the maneuver point that the vehicle is about to pass. The navigation key points are location points that contain the key shape of the navigation route on the electronic map.

Exemplarily, if the vehicle position on the map associated with the current position of the vehicle is located within a set area range of the terminal screen, or the distance between the current position of the vehicle and the next maneuver point is smaller than or equal to a set first distance threshold, the scale display event is generated. Here, the set area range refers to a designated coordinate area of the terminal screen, which may be a coordinate area within a fixed pixel from the screen borders. The first distance threshold may be a set fixed distance value, or may be adjusted according to the user's needs. For example, a scale display event is generated, if the position of the vehicle on the terminal screen is at a screen coordinate area which is $1/10$ and smaller than $1/10$ of the left and right width of the terminal screen from the left or right border of the terminal screen; or, if the distance between the current position of the vehicle and the next maneuver point is smaller than or equal to 500 meters, a scale display event is generated.

In S120, an optimal scale of the navigation map is calculated according to the navigation key points and a pixel size of a terminal screen.

Here, the to-be-displayed map area may be determined according to the navigation key points, and the optimal scale of the navigation map may be determined according to the to-be-displayed map area and the pixel size of the terminal screen, so that when the terminal screen displays the navigation map at the optimal scale, it may show the to-be-displayed map area completely and clearly, thereby enabling the user to anticipate the next maneuver point through the shown to-be-displayed map area. Specifically, the optimal scale may be calculated through the coordinate conversion between the pixel size of the terminal screen and the to-be-displayed map area, so that the navigation key points are properly distributed on the terminal screen.

In S130, the navigation route is navigated according to the optimal scale.

The navigation route is navigated according to the optimal scale, so that the user can anticipate the next maneuver point ahead of time and make corresponding preparations to improve the guidance of the navigation map and reduce the risk of missing an intersection during driving.

By distributing the navigation key points between the current position of the vehicle and the next maneuver point properly on the terminal screen according to the pixel size of the terminal screen, upon detecting a scale display event, and displaying the navigation route generated by the navigation key points on the terminal screen, the technical solution of the present embodiment enables the user to anticipate the next maneuver point ahead of time and make corresponding preparations, in order to improve the guidance of the navigation map and reduce the risk of missing an intersection during driving.

The Second Embodiment

Figure 2:
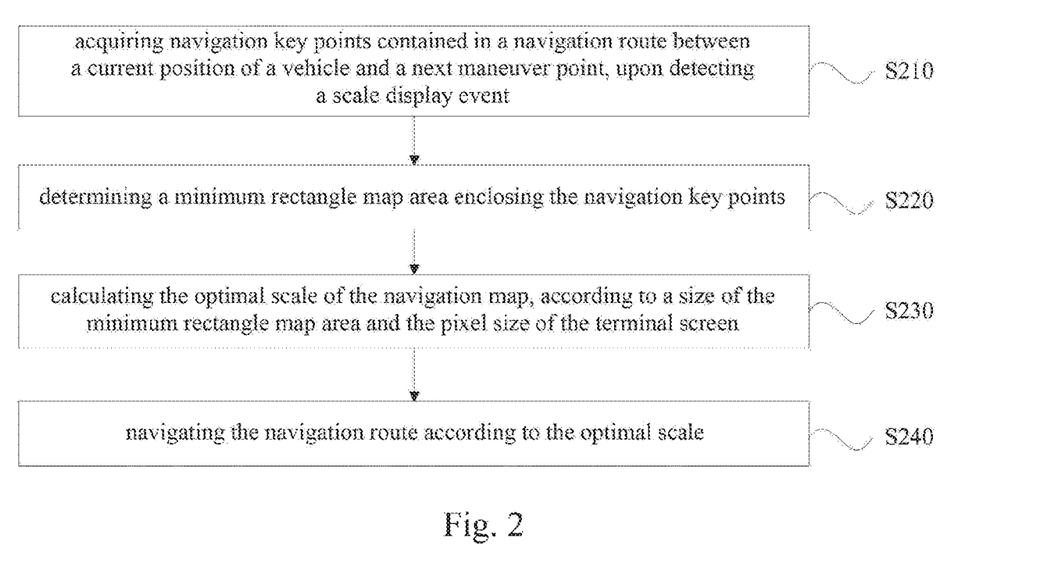
FIG. 2 is a flowchart of a method for controlling a navigation map according to the second embodiment of the present disclosure.

FIG. 2 is a flowchart of a method for controlling a navigation map according to the second embodiment of the present disclosure. The present embodiment specifically provides a new method for controlling a navigation map on the basis of the foregoing the first embodiment. Referring to FIG. 2, the method for controlling a navigation map provided by the present embodiment specifically includes the following.

In S210, navigation key points contained in a navigation route between a current position of a vehicle and a next maneuver point are acquired, upon detecting a scale display event.

In S220, a minimum rectangle map area enclosing the navigation key points is determined.

Here, the minimum rectangle map area enclosing the navigation key points refers to the rectangular map area with the smallest area containing all the navigation key points. Therefore, the minimum rectangle map area includes the current position of the vehicle and the next maneuver point.

In S230, the optimal scale of the navigation map is calculated according to a size of the minimum rectangle map area and the pixel size of the terminal screen.

Figure 3:
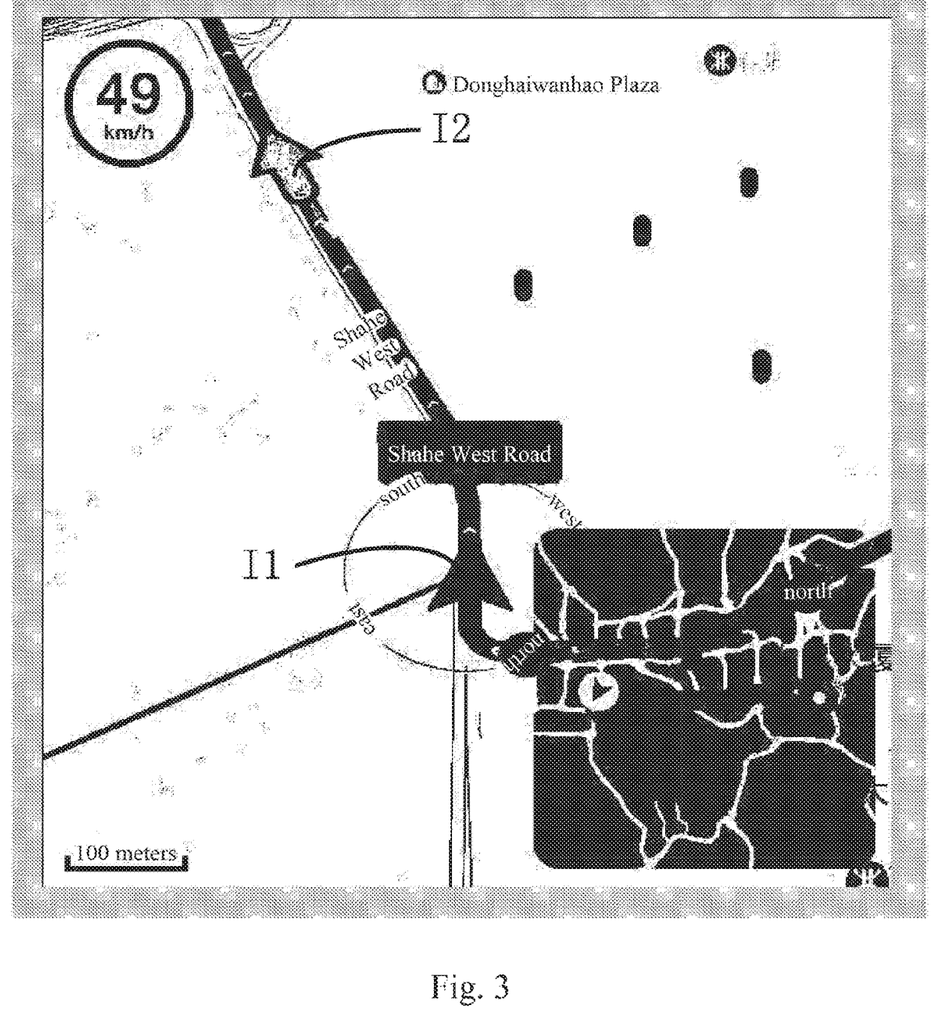
FIG. 3 is a schematic effect diagram of the method for controlling a navigation map according to the second embodiment of the present disclosure.

Here, the size of the minimum rectangular map area may be equal to or smaller than the size of the terminal screen, so that the navigation route between the current position of the vehicle and the next maneuver point is displayed clearly and completely on the terminal. As shown in FIG. 3, the arrow I1 is the current location point of the vehicle, the arrow I2 is the next maneuver point, and the size of the minimum rectangle map area is smaller than the size of the terminal screen. By displaying the navigation map, the user may clearly anticipate the next maneuver point. The optimal scale may be calculated according to the size of the minimum rectangle map area and the pixel size of the terminal screen.

In S240, the navigation route is navigated according to the optimal scale.

The minimum rectangle map area and its navigation route within are displayed according to the calculated optimal scale.

By determining the minimum rectangle map area enclosing the navigation key points using the navigation key points between the current position of the vehicle and the next maneuver point, then determining the optimal scale by displaying the minimum rectangle map area properly on the terminal screen, the technical solution of the present embodiment enables the terminal to properly display the minimum rectangle map area according to the optimal scale while displaying the complete navigation route.

The Third Embodiment

Figure 4:
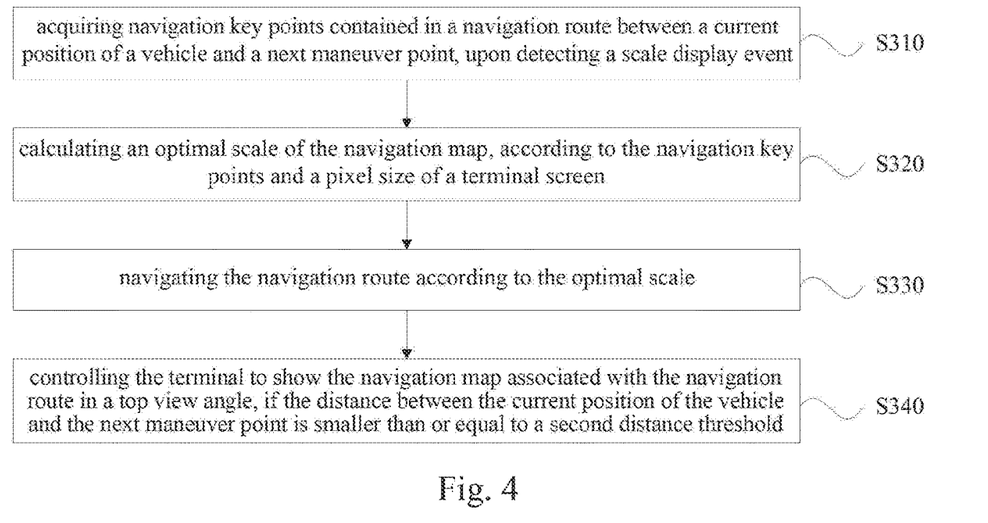
FIG. 4 is a flowchart of a method for controlling a navigation map according to the third embodiment of the present disclosure.

FIG. 4 is a flowchart of a method for controlling a navigation map according to the third embodiment of the present disclosure. The present embodiment increases the terminal's control over the exhibit angle of the navigation route, after navigating the navigation route based on the first embodiment and the second embodiment, enabling the user to focus on route information near the maneuver point when approaching the maneuver point. Referring to FIG. 4, the method for controlling a navigation map provided by the present embodiment specifically includes the following.

In S310, navigation key points contained in a navigation route between a current position of a vehicle and a next maneuver point are acquired upon detecting a scale display event;

In S320, an optimal scale of the navigation map is calculated according to the navigation key points and a pixel size of a terminal screen;

In S330, the navigation route is navigated according to the optimal scale;

In S340, if the distance between the current position of the vehicle and the next maneuver point is smaller than or equal to a second distance threshold, the terminal is controlled to show the navigation map associated with the navigation route in a top view perspective, wherein the second distance threshold is smaller than the first distance threshold.

Here, the second distance threshold refers to the distance between the vehicle and the next maneuver point, when the terminal starts to show the navigation map in the top view perspective, and the second distance threshold may be set as needed, and specifically may be 10 meters.

In order to keep the optimal scale always within a proper value range, after calculating the optimal scale of the navigation map, the method may further include: if the calculated optimal scale is smaller than a set minimum scale threshold, determining the minimum scale threshold as a new optimal scale; and if the calculated optimal scale is greater than a set maximum scale threshold, determining the maximum scale threshold as the new optimal scale.

Here, the minimum scale threshold is the minimum value of the optimal scale preset based on experience; and the maximum scale threshold is the maximum value of the optimal scale preset based on experience. It may be understood that when the distribution of the navigation key points is relatively concentrated, the scale calculated through the navigation key points is larger and the display range is smaller. To avoid the display range being too small, if the calculated scale is smaller than the set minimum scale threshold, the minimum scale threshold is determined as the optimal scale. Similarly, when the distribution of the navigation key points is relatively scattered, the scale calculated through the navigation key points is smaller and the display range is larger. To avoid the display range being too large, if the calculated scale is greater than the set maximum scale threshold, the maximum scale threshold is determined as the optimal scale.

According to the technical solution of the present embodiment, after navigating the navigation route, the exhibit angle of the navigation route is adjusted into the top view perspective by the terminal, and the top view perspective can better show traffic information at the maneuver point, enabling the user at the maneuver point to focus on the route information near the maneuver point.

Exemplarily, the calculating an optimal scale of the navigation map, according to the navigation key points and a pixel size of a terminal screen, may include: determining a minimum rectangle map area enclosing the navigation key points; and calculating the optimal scale of the navigation map, according to a size of the minimum rectangle map area and the pixel size of the terminal screen.

The Fourth Embodiment

Figure 5:
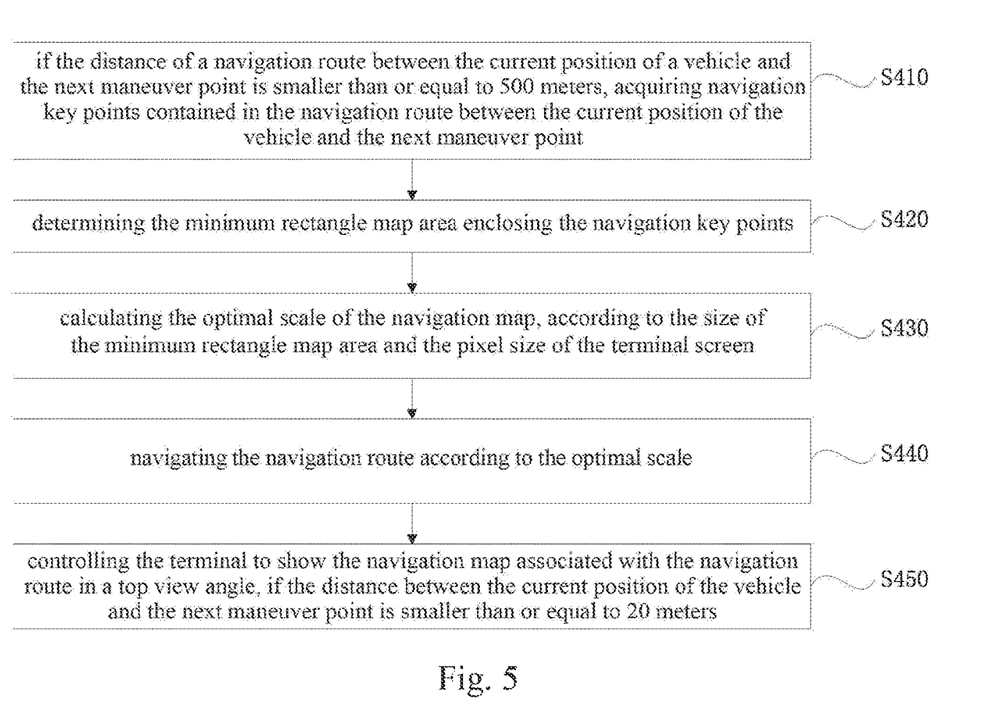
FIG. 5 is a flowchart of the method for controlling a navigation map according to the fourth embodiment of the present disclosure.

FIG. 5 is a flowchart of the method for controlling a navigation map according to the fourth embodiment of the present disclosure. The present embodiment is a specific embodiment proposed on the basis of the above embodiments. In the present embodiment, a vehicle travelling on the expressway is taken as an example. Referring to FIG. 5, the method for controlling a navigation map provided by the present embodiment specifically includes the following.

In S410, if the distance of a navigation route between the current position of a vehicle and the next maneuver point is smaller than or equal to 500 meters, navigation key points contained in the navigation route between the current position of the vehicle and the next maneuver point are acquired.

Here, the vehicle is travelling on the expressway, and the next maneuver point may be an expressway exit in the navigation route that the vehicle is about to pass.

In S420, the minimum rectangle map area enclosing the navigation key points is determined.

Here, the minimum rectangle map area enclosing the navigation key points may be determined according to all the navigation key points contained in the navigation route between the current position of the vehicle and the expressway exit the vehicle is about to pass. The minimum rectangular map area includes at least the current position of the vehicle, the expressway exit the vehicle is about to pass, and the navigation route in between.

In S430, the optimal scale of the navigation map is calculated according to the size of the minimum rectangle map area and the pixel size of the terminal screen.

For example, if the pixel size of the terminal screen is 240*320, the size of the minimum rectangle map area is 480*600, and the display scale of the original minimum rectangle map area is 1:50, then the optimal scale may be calculated to be 1:100 according to the coordinate conversion ratio of the pixel size of the terminal screen and the minimum rectangular map area.

In S440, the navigation route is navigated according to the optimal scale.

In S450, if the distance between the current position of the vehicle and the next maneuver point is smaller than or equal to 20 meters, the terminal is controlled to show the navigation map associated with the navigation route in a top view perspective.

Here, the navigation map associated with the navigation route may be the navigation map including the minimum rectangular map area.

The technical solution of the present embodiment displays the navigation map between the current position of the vehicle and the expressway exit the vehicle is about to pass properly on the terminal screen through the minimum rectangular map area, enabling the user to anticipate the expressway exit the vehicle is about to pass ahead of time. At the same time, when approaching the expressway exit, it controls the exhibit angel of the navigation route to be a top view perspective, enabling the user to pay more attention to the route information near the expressway exit, thus improving the guidance of the navigation map, and reducing the risk of missing an expressway exit during driving.

The Fifth Embodiment

Figure 6:
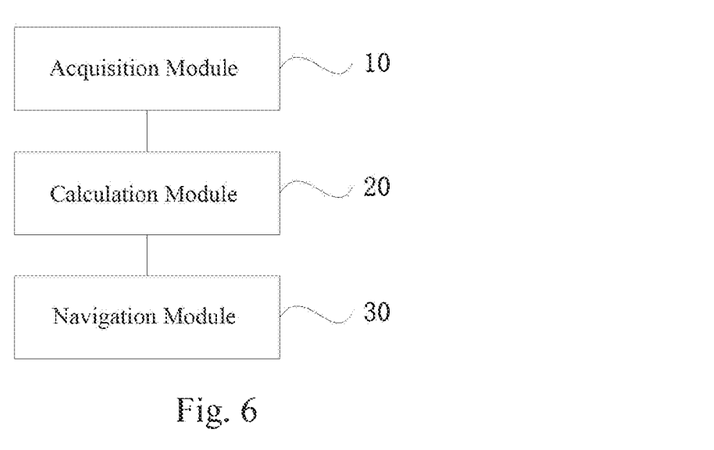
FIG. 6 is a schematic structural diagram of an apparatus for controlling a navigation map according to the fifth embodiment of the present disclosure.

FIG. 6 is a schematic structural diagram of an apparatus for controlling a navigation map according to the fifth embodiment of the present disclosure. The present embodiment may be applicable to the properly displaying of a navigation map. Referring to FIG. 6, the apparatus for controlling a navigation map provided by the present embodiment specifically includes an acquisition module 10, a calculation module 20 and a navigation module 30.

Here, the acquisition module 10 may be configured to acquire navigation key points contained in a navigation route between a current position of a vehicle and a next maneuver point, upon detecting a scale display event; the calculation module 20 may be configured to calculate an optimal scale of the navigation map, according to the navigation key points and a pixel size of a terminal screen; and the navigation module 30 may be configured to navigate the navigation route according to the optimal scale.

Specifically, the calculation module 20 may include a map area determining unit and a scale calculation unit.

The map area determining unit may be configured to determine a minimum rectangle map area enclosing the navigation key points; and the scale calculation unit may be configured to calculate the optimal scale of the navigation map, according to a size of the minimum rectangle map area and the pixel size of the terminal screen.

Further, the apparatus may also include a determining module. The determining module may be configured to, after calculating the optimal scale of the navigation map, if a calculated optimal scale is smaller than a set minimum scale threshold, determine the minimum scale threshold as a new optimal scale; and if the calculated optimal scale is greater than a set maximum scale threshold, determine the maximum scale threshold as the new optimal scale.

Preferably, if a vehicle position on the map associated with the current position of the vehicle is located in a set area range of the terminal screen, or a distance between the current position of the vehicle and the next maneuver point is smaller than or equal to a set first distance threshold, generate the scale display event.

Further, the apparatus may also include a view perspective adjusting module. The view perspective adjusting module may be configured to, after navigating the navigation route according to the optimal scale, control the terminal to show the navigation map associated with the navigation route in a top view perspective, if the distance between the current position of the vehicle and the next maneuver point is smaller than or equal to a second distance threshold, wherein the second distance threshold is smaller than the first distance threshold.

Specifically, the maneuver point may include at least one of a vehicle lane change location, a lane change location, and a vehicle swerve location.

The apparatus for controlling a navigation map provided by the present embodiment and the method for controlling a navigation map provided by any embodiment of the present disclosure belong to the same inventive concept and may perform the method for controlling a navigation map provided by any embodiment of the present disclosure, has the corresponding functional modules and beneficial effects of performing the method for controlling a navigation map. For technical details not described in detail in the present embodiment, reference may be made to the method for controlling a navigation map provided by any embodiment of the present disclosure.

The Sixth Embodiment

The sixth embodiment of the present disclosure provides a terminal, which includes the apparatus for controlling a navigation map provided by any embodiment of the present disclosure.

Figure 7:
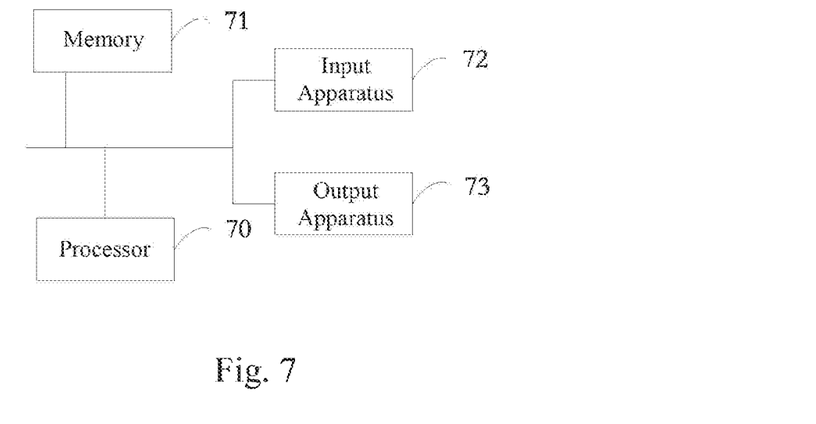
FIG. 7 is a schematic structural diagram of a terminal according to the sixth embodiment of the present disclosure.

Specifically, as shown in FIG. 7, the embodiments of the present disclosure provides a terminal. The terminal includes a processor 70, a memory 71, an input apparatus 72 and an output apparatus 73. The number of processors 70 in the terminal may be one or more, and one processor 70 is taken as an example in FIG. 7. The processor 70, the memory 71, the input apparatus 72 and the output apparatus 73 in the terminal may be connected via a bus or in other manners. FIG. 7 takes the connection via a bus as an example.

As a computer readable storage medium, the memory 71 may be used for storing software programs, computer executable programs and modules, for example, program instructions/modules corresponding to the method for controlling a navigation map in the embodiments of the present disclosure (for example, the acquisition module 10, the calculation module 20 and the navigation module 30 in the apparatus for controlling a navigation map). The processor 70 runs the software programs, instructions, and modules stored in the memory 71 to execute various function applications and data processing of the terminal, so as to implement the method for controlling a navigation map as discussed above.

The memory 71 may include a program storage area and a data storage area. The program storage area may store an operating system and an application program for at least one function. The data storage area may store data created according to the use of the terminal, and the like. In addition, the memory 71 may include a high speed random access memory, and may further include a non-volatile memory, for example, at least one magnetic disk storage device, flash memory device, or other non-volatile solid state storage device. In some embodiments, the memory 71 may further include memories disposed remote to the processors 70. These remote memories may be connected to the terminal through a network. Examples of the network include, but are not limited to, the Internet, an enterprise intranet, a local area network, a mobile communication network, and a combination thereof.

The input apparatus 72 may be used for receiving input digital or character information, and generating key signal inputs related to user settings of the terminal and the function control. The output apparatus 73 may include a display screen or other display devices.

The embodiments of the present disclosure further provide a storage medium containing computer executable instructions for executing a method for controlling a navigation map when executed by a computer processor, the method includes:

acquiring navigation key points contained in a navigation route between a current position of a vehicle and a next maneuver point, upon detecting a scale display event;

calculating an optimal scale of the navigation map, according to the navigation key points and a pixel size of a terminal screen; and navigating the navigation route according to the optimal scale.

According to the descriptions of the above embodiments, those skilled in the art may clearly understand that the present disclosure may be implemented by means of software and necessary general-purpose hardware, and may be implemented, obviously, by means of hardware. However, the former is a preferred implementation in most circumstances. Based on such understanding, the technical solution of the present disclosure essentially, or the part contributing to the prior art may be embodied in the form of a software product. The computer software product may be stored in a computer readable storage medium, such as a floppy disk, a Read-Only Memory (ROM), a Random Access Memory (RAM), a flash memory, a hard disk or an optical disk of a computer, and includes several instructions for enabling a computer device (which may be a personal computer, a server, or a network device, and the like) to execute the method described in the embodiments of the present disclosure.

It should be noted that, in the above embodiments of the apparatus for controlling a navigation map, the units and modules included are merely divided according to a functional logic, but the present disclosure is not limited to the above division, as long as the corresponding functions can be achieved. In addition, the specific names of the functional units are merely used for distinguishing, and are not intended to limit the protection scope of the present disclosure.

The above descriptions are merely specific embodiments of the present disclosure, and the protection scope of the present disclosure is not limited thereto. Any changes or replacements that can be easily conceived of by those skilled in the art within the technical scope disclosed by the present disclosure should be covered by the protection scope of the present disclosure. Therefore, the protection scope of the present disclosure should be based on the protection scope of the claims.

What is claimed is:

1. A method for controlling a navigation map, comprising:
   controlling a terminal to display a navigation map at an exhibit angle;
   generating a scale display event in response to determining that a distance between a current position of a vehicle and a next maneuver point is smaller than or equal to a set first distance threshold, wherein the scale display event initiates display of the navigation map (1) at the exhibit angle, wherein the exhibit angle is not a top view perspective, and (2) at a zoom-in view;
   acquiring navigation key points contained in a navigation route between the current position of the vehicle and the next maneuver point, upon detecting the scale display event;
   calculating an optimal scale of the navigation map, according to the navigation key points and a pixel size of a terminal screen, wherein when the navigation map is displayed at the optimal scale, the navigation key points are distributed on the terminal screen;
   navigating the navigation route according to the optimal scale; and
   controlling the terminal to show the navigation map associated with the navigation route from the exhibit angle to the top view perspective, in response to determining that the distance between the current position of the vehicle and the next maneuver point is smaller than or equal to a second distance threshold, wherein the second distance threshold is smaller than the first distance threshold,
   wherein the method is performed by at least one hardware processor.

2. The method according to claim 1, wherein the calculating the optimal scale of the navigation map, according to the navigation key points and the pixel size of the terminal screen, comprises:
   determining a minimum rectangle map area enclosing the navigation key points, the current position of the vehicle and the next maneuver point; and
   calculating the optimal scale of the navigation map, according to a size of the minimum rectangle map area and the pixel size of the terminal screen.

3. The method according to claim 2, after calculating the optimal scale of the navigation map, the method further comprising:
   in response to determining that a calculated optimal scale is smaller than a set minimum scale threshold, determining the minimum scale threshold as a new optimal scale; and
   in response to determining that the calculated optimal scale is greater than a set maximum scale threshold, determining the maximum scale threshold as the new optimal scale.

4. The method according to claim 1, wherein the maneuver point includes at least one of a vehicle lane change location, a vehicle turnaround location, or a vehicle swerve location.

5. The method according to claim 1, wherein the navigation key points are distributed on the navigation route according to the pixel size of the terminal screen.

6. The method according to claim 1, wherein the navigation map displays a first arrow corresponding to a location of the vehicle and a second arrow corresponding to a location of the next maneuver point.

7. The method according to claim 6, wherein the second arrow points in a direction of the vehicle upon arrival at the next maneuver point.

8. An apparatus for controlling a navigation map, comprising:
   at least one processor; and
   a memory storing instructions, which when executed by the at least one processor, cause the at least one processor to perform operations, the operations comprising:
   controlling a terminal to display a navigation map at an exhibit angle;
   generating a scale display event in response to determining that a distance between a current position of a vehicle and a next maneuver point is smaller than or equal to a set first distance threshold, wherein the scale display event initiates display of the navigation map (1) at the exhibit angle, wherein the exhibit angle is not a top view perspective, and (2) at a zoom-in view;

acquiring navigation key points contained in a navigation route between the current position of the vehicle and the next maneuver point, upon detecting the scale display event;

calculating an optimal scale of the navigation map, according to the navigation key points and a pixel size of a terminal screen, wherein when the navigation map is displayed at the optimal scale, the navigation key points are distributed on the terminal screen;

navigating the navigation route according to the optimal scale; and controlling the terminal to show the navigation map associated with the navigation route from the exhibit angle to the top view perspective, in response to determining that the distance between the current position of the vehicle and the next maneuver point is smaller than or equal to a second distance threshold, wherein the second distance threshold is smaller than the first distance threshold.

9. The apparatus according to claim 8, wherein the calculating the optimal scale of the navigation map, according to the navigation key points and the pixel size of the terminal screen comprises:

determining a minimum rectangle map area enclosing the navigation key points, the current position of the vehicle and the next maneuver point; and calculating the optimal scale of the navigation map, according to a size of the minimum rectangle map area and the pixel size of the terminal screen.

10. The apparatus according to claim 9, after calculating the optimal scale of the navigation map, the operations further comprising:

in response to determining that a calculated optimal scale is smaller than a set minimum scale threshold, determining the minimum scale threshold as a new optimal scale; and in response to determining that the calculated optimal scale is greater than a set maximum scale threshold, determining the maximum scale threshold as the new optimal scale.

11. The apparatus according to claim 8, wherein the maneuver point includes at least one of a vehicle lane change location, a vehicle turnaround location, or a vehicle swerve location.

12. A non-transitory computer storage medium storing a computer program, which when executed by one or more processors, causes the one or more processors to perform operations, the operations comprising:

controlling a terminal to display a navigation map at an exhibit angle;

generating a scale display event in response to determining that a distance between a current position of a vehicle and a next maneuver point is smaller than or equal to a set first distance threshold, wherein the scale display event initiates display of the navigation map (1) at the exhibit angle, wherein the exhibit angle is not a top view perspective, and (2) at a zoom-in view;

acquiring navigation key points contained in a navigation route between the current position of the vehicle and the next maneuver point, upon detecting the scale display event;

calculating an optimal scale of the navigation map, according to the navigation key points and a pixel size of a terminal screen, wherein when the navigation map is displayed at the optimal scale, the navigation key points are distributed on the terminal screen;

navigating the navigation route according to the optimal scale; and controlling the terminal to show the navigation map associated with the navigation route from the exhibit angle to the top view perspective, in response to determining that the distance between the current position of the vehicle and the next maneuver point is smaller than or equal to a second distance threshold, wherein the second distance threshold is smaller than the first distance threshold.

\* \* \* \* \*